United States Patent [19]

Bello et al.

[11] 4,126,226

[45] Nov. 21, 1978

[54] ORE SEPARATOR

[76] Inventors: Mark B. Bello, ulitsa Savushkina, 24, kv. 28; Jury P. Gittemeier, Zanevsky prospekt, 43, kv. 43; Nikolai I. Komyak, Kostromskoi prospekt, 22, kv. 71; Anatoly I. Levitin, Zheleznovodskaya ulitsa, 40, kv. 71; Valery I. Stolin, prospekt Raevskogo, 12, kv. 44; Semen P. Frumkin, Kubinskaya ulitsa, 34, kv. 11, all of, Leningrad; Viktor S. Vijunnik, ulitsa Lenina, 44, kv. 11, Mirny Yakutskoi ASSR; Anatoly B. Leites, ulitsa Lenina, 27, kv. 16, Mirny Yakutskoi ASSR; Jury V. Lyakhov, ulitsa Lenina, 21, kv. 6, Mirny Yakutskoi ASSR; Vladlen V. Novikov, ulitsa Akademika Pavlova, 14, kv. 20, Mirny Yakutskoi ASSR; Felix A. Patsiansky, ulitsa 40 Let Oktyabrya, 4, kv. 1, Mirny Yakutskoi ASSR; Alexandr I. Semyanov, ulitsa Lenina, 21, kv. 5, Mirny Yakutskoi ASSR; Nikolai M. Yaroshevich, ulitsa Lenina, 8, kv. 20, Mirny Yakutskoi ASSR, all of U.S.S.R.

[21] Appl. No.: 755,038

[22] Filed: Dec. 28, 1976

[51] Int. Cl.[2] ........................ B07C 5/346; B65G 31/00

[52] U.S. Cl. .................................... 209/589; 209/639; 209/915; 209/939

[58] Field of Search .................... 209/111.5, 73, 74 R, 209/72; 198/642

[56] References Cited

U.S. PATENT DOCUMENTS

| | | | |
|---|---|---|---|
| 3,011,634 | 12/1961 | Hutter et al. | 209/74 R |
| 3,357,557 | 12/1967 | Austin | 209/74 R |
| 3,415,496 | 12/1968 | Evans, Jr. | 209/73 X |
| 3,424,388 | 1/1969 | Reichel | 209/73 X |
| 3,512,002 | 5/1970 | Decker | 209/111.5 X |

FOREIGN PATENT DOCUMENTS

| | | | |
|---|---|---|---|
| 135,743 | 1961 | U.S.S.R. | 209/73 |

*Primary Examiner*—Robert B. Reeves
*Assistant Examiner*—Edward M. Wacyra
*Attorney, Agent, or Firm*—Lackenbach, Lilling & Siegel

[57] ABSTRACT

The separator comprises a housing with a charging apparatus arranged above an apparatus for delivering and preparing the ore in a layer one grain thick. The apparatus for delivering is made as a bowl provided with a drive for rotation. Enveloping the bowl is a vertical partition dividing the interior of the housing into annular compartments for receiving the products of separation. Disposed above the bowl is a horizontal light-insulating partition on which X-ray tubes, photocells and air ejectors are mounted. The horizontal partition is formed with an opening to receive the charging apparatus and with slots for the passage of X-ray radiation, X-ray luminescence and air pulses.

5 Claims, 3 Drawing Figures

ORE SEPARATOR

FIELD OF THE INVENTION

The present invention relates to ore separators and more particularly, to those employed in the separation of diamonds.

DESCRIPTION OF THE PRIOR ART

The diamond-producing industry of today makes extensive use of jigs for treating diamond-bearing ores sized down to 4 mm.

However, the jigging machines used for this purposes are characterized by their enormous consumption of water, the treatment of which presents significant difficulties. Moreover, these machines occupy large working areas and require additional equipment and skilled personnel for effective operation.

There are also adapted for application for ore-dressing screw separators and water cyclones which consume, just like the above-mentioned jigging machines, considerable amounts of water or heavy liquids, the delivery of which requires a considerable power input.

Moreover, to obtain the preparation concentrate it is necessary to repeatedly carry out ore-dressing operations on a plurality of machines and to make provision for bulky storage tanks and settlers for slime water. Needless to say, the treating process applied to diamond-bearing ores is thus rendered still more complex and expensive.

Significant difficulties inherent in ore-dressing operations are encountered during the recovery of a heavy medium, during the process of utilizing reagents and during replacement of the rapidly wearing machine parts.

To eliminate the aforesaid difficulties, new types of machines based on the concept of X-ray luminescence have been recently introduced into the ore-dressing field. The machines of this type exhibit a higher efficiency in separating the grains of diamond from the mineral, thereby enabling the recovery of a high-grade diamond concentrate.

The use of water is unnecessary during the course of operation of the separating machines described above.

However, since the preliminary stages of the ore-dressing treatment include wet comminution and classification, it is necessary that a large amount of ore be dried before being fed for treatment onto the separating machines utilizing the effects of X-ray luminescence.

The drying of ore renders the ore-dressing operation far more expensive since it involves substantial power inputs and is accompanied by dust formation, to say nothing of the lower production rate of the ore treating process. The drying of the closely crushed ore causes a severe problem in that the crushed ore in wet state tends to form into lumps to become sintered and, when subjected to radiation in such a state, the grains of diamond are rendered undetectable under the layer of mineral grains. Hence, there are appreciable and highly undesirable losses of the valuable constituent mineral.

U.K. Pat. No. 888,283 discloses a sorting machine which comprises a shaking feeder adapted to deliver a feed material onto a conveyor belt above which are positioned infrared lamps and a photo-electric multiplier electrically connected to a valve-controlled means for producing a puff of air to remove an undesired object. The sorting machine of the patent referred to above operates in the following manner. The material to be separated is fed by the shaking feeder onto the conveyor belt on which it is introduced to the radiation and the viewing zone wherein said material is subjected to radiation with light from four lamps. Light received from the material or object is viewed by a photoelectric viewing means and then transformed into an electric pulse applied to the electronic circuit of the valve-controlled ejector means which produces a puff of air to remove an undesired object, the light objects being sorted out.

However, if the described sorting machine is fed with wet lumps of finely crushed material delivered thereinto by the shaking feeder, such lumps will not be broken down on the belt, which, consequently, may result in losses of the valuable material.

U.S.S.R. Inventor's Certificate No. 161,703 discloses a machine for treating diamond concentrates, which comprises a hopper a trough, an X-ray tube, and a photo-electronic multiplier electrically connected to an ejector means. The machine of the Inventor's Certificate referred to above is equally good for treating both dry and wet finely-crushed ores sized from 2 to 4 mm, the production rate thereof being up to 3000 l/hr.

However, in treatment of wet ores with a size ranging from 0.5 to 2 mm, the feed is formed into lumps, thus reducing the efficiency of the treating process. Due to the lump formation occuring in the feed material treated on the known machines of the luminescent type, a part of the lumped feed is rendered unviewable, thereby endangering a loss of diamonds which might be embedded therein. Loss of diamonds is likewise possible to take place during wet practice of treating ores sized down to 4 mm. Therefore, wet ores with a size ranging from 2 to 4 mm are practically not subjected to treatment on separating machines of the luminescent type.

SUMMARY OF THE INVENTION

It is an object of the present invention to obviate the above-stated difficulties.

The present invention has as its aim the provision of a novel ore separator construction permitting the reduction of expenses involved in the ore-dressing treatment by way of excluding both extensive water consumption and drying of the ore; the enhancement of efficiency of the the ore-dressing treatment by effecting maximum recovery of the high-grade diamond concentrate; and the construction of said separator so that it is of a small size, is reliable in operation and has a longer service life.

It is, accordingly, the primary object of the present invention to provide a novel ore separator, far more economical, as compared to the known ore separators of a similar type, operating without extensive water consumption and excluding the necessity of the ore drying operations.

Another important object of the invention is to enhance the efficiency of the ore-dressing treatment by achieving a maximum recovery of the high-grade concentrate containing a higher percentage of a valuable component.

Still another object of the invention is to provide a novel ore separator construction which is substantially small in size.

Yet another object of the invention is to provide an ore separator which features an enhanced operating reliability and a longer service life.

These and other objects and features of the invention are accomplished by an ore separator comprising a housing with a charging means mounted above a means for arranging the feed in a layer of one grain thickness. The charging means transfers the ore to an X-ray radiation zone created by at least two X-ray tubes, photo-electric means being positioned in the region where X-ray luminescence can be received electrically connected to the photo-electric means is an air ejector means mounted over and along the path of the feed grains opposite a vertical partition disposed intermediate of compartments for separation products. According to the invention, the feed arranging means is made in the form of a bowl provided with a drive means for its rotation and isolated from the X-ray tubes and the photo-electric means. All of which are arranged over and around said bowl, and mounted on a light-insulating horizontal partition formed with respective slots for the passage of X-ray radiation from the X-ray tubes onto the feed grains, for the passage of X-ray luminescence from the feed grains onto the photo-electric means, and for the passage of air pulses from the ejector means onto the luminescent feed grains. The horizontal partition is also formed with an opening for receiving said charging means. The vertical partition and compartments for the products of separation are arranged coaxially around the bowl of said feed arranging means.

Such a constructional arrangement of the ore separator of the invention renders it compact and reliable in operation owing to the provision of a single rotatably mounted member, the bowl. During rotation of the bowl, there takes place dewatering and comminution of the feed grains by the action of centrifugal forces. A film of water is formed on the inner surface of the bowl during its rotation and flows over the brim, whereas the ore and diamond grains follow paths different from those travelled by water drops.

As a result, favorable conditions are created which enable differential movement of the feed grains being flown out of the bowl to be and, thus, subjected to X-ray radiation, thereby causing their X-ray luminescence to be received by the photo-electric cells, thus actuating the ejector means to produce air pulses acting upon the luminescent feed grains. Thus, it is possible to effect practically selective and maximum recovery of diamond grains at a high performance rate of the herein proposed ore separator.

The horizontal light-insulating partition aids in detecting the grains of diamond. In addition, this partition affords protection to the components of the described separating machine from the feed grains being flown out of the bowl.

The ore separator of the invention is rendered compact due to the provision of the vertical partition and the compartments for the separation products arranged coaxially with the bowl.

It is advantageous that the interior of the bowl of the proposed separator have a shape substantially close to that of paraboloid, with an upper portion of the bowl having a funnel-shaped surface, the generatrix of which forms with a vertical an angle ranging from 5° to 15°.

Such a shape of the bowl interior ensures minimum deviation of the feed grains from the prescribed paths of travel. Thus, the luminescent feed grains are much easier to detect and to be acted upon by the air pulses in order to direct the feed grains with diamond grains and the rejected tailings to the respective compartments for separation products.

If the taper angle of the funnel-shaped surface of the bowl is less than 5°, the velocity of the upwardly moving feed grains will be reduced or even become zero, which is highly undesirable.

If, however, the taper angle of the funnel-shaped surface is more than 15°, there will be an overspread in the travelling paths of the feed grains.

It is preferable that the bottom portion of the bowl interior be fitted with vertical radially disposed blades, the adjacent blades spaced within a distance being equal to at least twice the diameter of an average sized feed grain.

The blades of the type described will prevent the feed grains from slipping to the bottom portion of the bowl and serve as guides for the upward movement of the grains.

The indicated inter-blade spacing eliminates any possibility of the feed grains getting stuck between the bowl blades.

It is preferable that screens be mounted on the horizontal light-insulating partition, each of said screens defining a sector in which a photocell receives radiation from a luminescent grain and sends a signal to at least one respective air ejector.

The screens described above will help to divide the circular zone of radiation around the bowl of the proposed separating machine into sections, for example, into four sections. This division makes it possible to operate only those ejectors which are positioned above the area in which the luminescent feed grains have been detected. Reasonable consumption of compressed air is thus ensured during the treatment of ores, especially those rich in diamonds.

It is essential that each photocell be electrically connected to an air ejector, the air ejector being offset with respect to the photocell by an angle of displacement $$\phi = \arc\cos\frac{D_4}{D_o} - \arc\cos\frac{D_4}{D_p}$$

where $D_4$ is the diameter of the bowl, $D_o$ is the diameter of the cut-off zone and $D_p$ is the diameter of the detection zone The fact that the photocell is electrically connected to the air ejector and is displaced by the above-mentioned angle makes it possible to act upon the detected luminescent feed grain while taking into account the path of its travel, the response of the respective ejector and the actual location of the luminescent feed grain.

It is necessary to take into account the angle of displacement between the detection and cut-off zones since the feed grains enter the detection zone not radially, but at an angle to the radius defined by the travelling path of the feed grains from the bowl along a tangent to the edge of its outer surface. As a result, air pulses produced by the ejector means will more accurately act upon the luminescent feed grains and will thereby substantially reduce the amount of the concomittant rock grains getting into the compartment for the concentrate.

BRIEF DESCRIPTION OF THE DRAWINGS

Additional objects and features of the invention will appear from the following description in which the preferred embodiment is set forth in detail in conjunction with the accompanying drawings. Referring to the drawings.

DETAILED DESCRIPTION OF THE INVENTION

Figure 2:
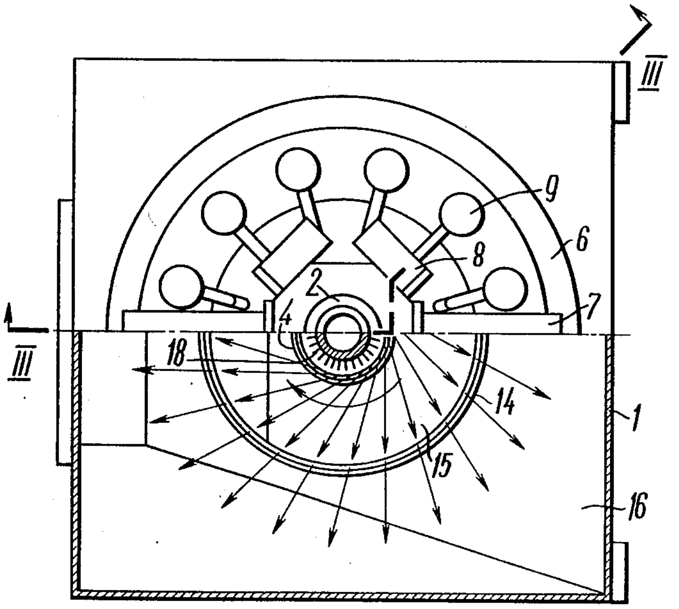
FIG. 2 is a top view of the separator with a partial cut-out.
Figure 3:
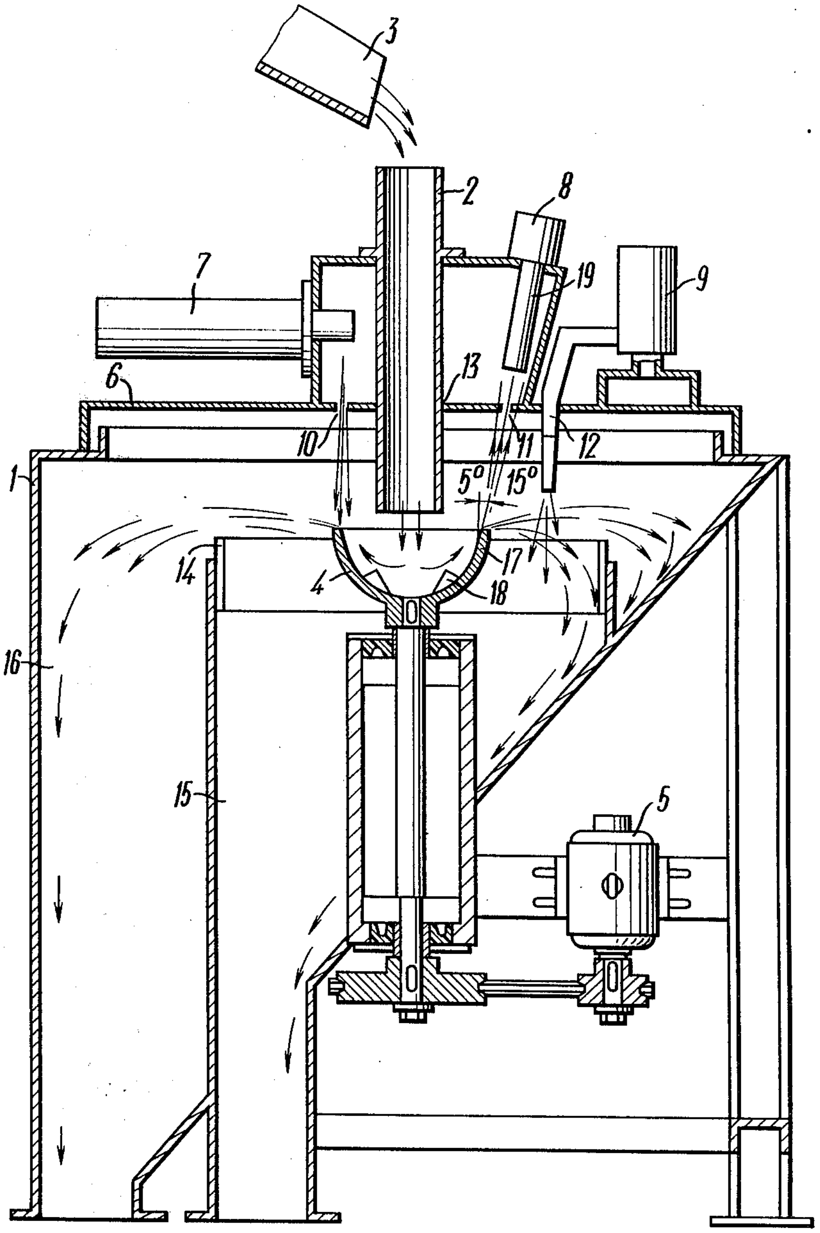
FIG. 3 is a cross-sectional view of the separator taken along the line III—III of FIG. 2.

Referring now to the above drawings, there is illustrated an ore separator according to this invention. The separator comprises a housing 1 (see FIG. 1) on which a charging apparatus or means 2, in the form of a tube adapted to receive feed from a shaking feeder 3 is mounted. The feed is delivered onto an apparatus or means adapted to arrange a feed in a layer, one grain thick and made in the form of a bowl 4, as shown in FIG. 2. The bowl 4 is provided with a drive 5 for its rotation, as shown in FIG. 3. The interior of the housing 1 (see FIG. 1) is divided by a horizontal light-insulating partition 6 which isolates the bowl 4 from the means adapted to control the separator operation and arranged above the bowl 4. The control means is provided with at least two X-ray tubes 7, two photocells 8 and two air ejectors 9 mounted on the light-insulating partition 6 and arranged over and around the bowl 4.

To enable the passage of X-ray radiation from the tubes 7 to the annular zone formed around the bowl 4, the horizontal light-insulating partition 6 is formed with slots 10 as shown in FIG. 3. To enable the photocells 8 to receive the X-ray luminescence from the feed grains, the light-insulating partition 6 is formed with slots 11. To permit the passage of air pulses, or puffs of air, produced by the ejector means 9 and directed at the feed luminescent grains, the partition 6 is formed with slots 12. In addition to the slots 10, 11 and 12, there is also provided in the horizontal-light insulating partition 6 a round opening 13 in which the charging means 2 is received in coaxial arrangement with the bowl 4. Arranged coaxially with the bowl 4 is a vertical partition 14, as shown in FIG. 2. This partition 14 defines a compartment 15 for receiving the concentrate and a compartment 16 for receiving rejected tailings.

The interior surface of the bowl 4 (see FIG. 3) has a shape substantially similar to that of a paraboloid. The upper portion of the bowl 4 has a funnel-shaped surface, the generatrix of which forms with a vertical an angle ranging from 5° to 15°. The interior bottom portion of the bowl 4 is fitted with vertical blades 18, as shown in FIG. 2, which are arranged radially. The adjacent blades 18 are spaced within a distance equal to at least twice the diameter of an average feed grain.

Figure 1:
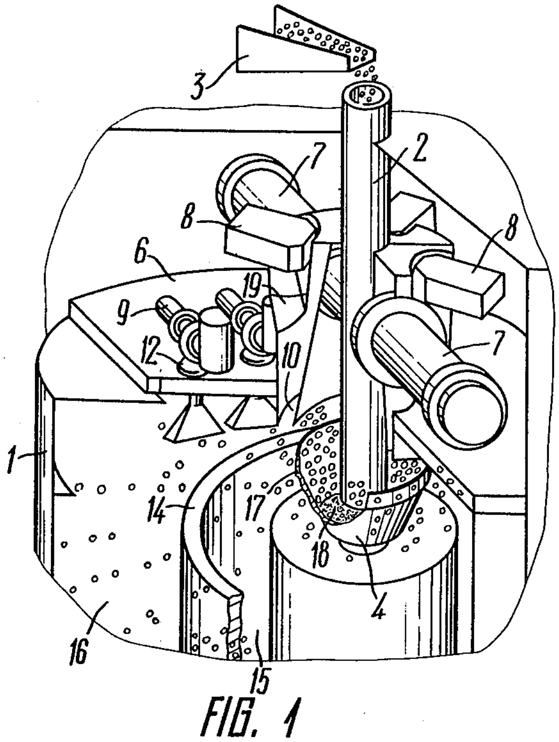
FIG. 1 is a perspective view of a separator of the invention, partly broken away.

Mounted on the horizontal light insulating partition 6 are screens 19, as shown in FIG. 1, each of which defines a sector within which a respective photocell 8 receives X-ray luminescence from an irradiated feed grain and sends a signal to at least one respective air ejector 9. Each of the ejectors 9 is electrically connected to the respective photocell 8 and is arranged over and along the path of the feed grains opposite the vertical partition 14.

Each of the photocells 8 is offset relative to the respective air ejector 9 by an angle of displacement $$\phi = \arc\cos\frac{D_4}{D_o} - \arc\cos\frac{D_4}{D_p}$$

where $D_4$ is the diameter of the bowl, $D_o$ is the diameter of the cut-off zone, and $D_p$ is the diameter of the detection zone.

The ore separator of the invention operates in the following manner.

An ore, for example, a diamond-bearing one with a grain size ranging from 0.5 to 2 mm, or from 2 to 4 mm, is fed by the shaking feeder 3 (see FIGS. 1 and 3) through the charging means or tube 2 to the bowl 4 of the feed preparing means. The bowl 4 is rotated about its longitudinal axis by means of the drive 5 mechanically associated with it. The amount of water used is 0.2 $m^3$ per one ton ore. The feed is continuously delivered to the bottom of the bowl 4 which is a centrifugal former of a single-layer stream of ore being treated. The dispersion of the feed grains at the interior parabolic surface of the rotating bowl is effected by the action of centrifugal forces. The blades 18, radially arranged at the bottom portion of the bowl 4, prevent the feed grains from slipping and direct the grains upwardly towards the upper portion of the paraboloid, the funnel-shaped portion 17.

The centrifugal former or bowl 4 rotates at a constant angular speed ω. Once on the interior surface of the bowl, the feed grains commence to travel along the paraboloid generatrix at a velocity:

$$v_{GRAIN} = \sqrt{2(PW^2 - g)(X - X_o)}$$

where $X_o$ is the initial position of a grain,

X is the current position of the grain,

P is the parameter of the parabola, and $g$ is the free-fall acceleration (gravity).

With the successive upward movement of the feed grain, at the section of the paraboloid surface, the following condition is fulfilled $Pw^2 - g > 0$.

If the feed grains were to leave the former or bowl 4 in the paraboloid zone, then the travelling path of the leaving grains would differ from grain to grain due to the difference in shape and in coefficients of friction.

While the bowl 4 is rotating, a film of water is formed at the interior surface of the bowl 4 by the action of centrifugal forces. Having no air space, the film of water is held by atmospheric pressure on the parabolic inner surface of the bowl 4 somewhat longer than the feed grains. The water films, which held the feed grains in lumps due to the surface tension, disintegrate under the action of centrifugal forces.

Thus, under the action of centrifugal forces and due to an optimum angle of taper at the inner surface of the funnel-shaped portion 17, which has been found to lie within the range of from 5° to 15°, the feed is dewatered and the lumps of feed grains are caused to disintegrate at the output of the bowl 4.

As a result, the flow of water at the output of the bowl 4 travels at a lower path than that of the feed grains.

The feed grains, in fact, are moving along paths lying in the horizontal plane at the brim of the bowl 4 having a circularly directed diagram for the corresponding movement of the feed stream. The sources of the initial radiation, the X-ray tubes 7, and the receivers of the X-ray luminescence, the photocells 8, are both provided with shapers for a circular zone of excitation and detection with the center thereof coinciding with the axis of rotation of the centrifugal bowl 4. The photoelectric means and the X-ray tubes are arranged together with the ejector means, the air ejectors 9, in planes parallel to that in which the single-layer feed stream is formed.

Thus, the feed grains, dispersed in the circular zone around the bowl 4 and arranged in a layer, one grain thick, are ideally exposed to X-ray radiation. The X-ray tubes 7, photocells 8 and air ejectors 9 are energized at the same time as the feed is delivered to the bowl 4. The detachable horizontal partition 6 insulates from light the compartment which accommodates the bowl 4. The feed grains which flow out of the bowl 4, enter the circular zone of X-ray radiation produced by the two X-ray tubes 7, each of which radiates an arc of 180° and helps to avoid a shadow being formed by the tube of the charging means. The diamond grains, passing through the radiation zone of X-ray excitation, reflect X-ray luminescence, which is then received by the photocells 8 which control the air ejectors 9 by an electronic circuit. The luminescent grains, contained in the feed stream being treated, are thus detected.

The provision of screens 19, restricting the range of action of the photocells 8, enables the signal to be passed to only the air ejectors 9 arranged or located in the travelling path of the luminescent grains.

The ejector means are operated to produce a puff of air to sort out the luminescent grain from the feed stream, whereby the diamond grains are directed to the compartment 15 for the concentrate, the undesired ore grains being directed to fall over the vertical annular partition 14 and to land in the compartment 16 for rejected tailings.

Selective operation of the air ejectors 9, which depends upon the line of fall of the luminescent grain and the speed of response of the respective ejector 9, substantially decreases, percentagewise, the amount of ore grains getting into the concentrate.

It is to be noted that the true location of a luminescent grain has been successfully determined by trial and error.

The feed grains travel from the bowl 4 along the tangent to its outer surface and enter the detection zone of luminescent radiation and the luminescent grain cut-off zone at an angle of displacement $$\phi = \arc\cos\frac{D_4}{D_o} - \arc\cos\frac{D_4}{D_p}$$

where $D_4$ is the diameter of the bowl, $D_o$ is the diameter of the cut-off zone, and $D_p$ is the diameter of the detection zone.

Individual operation of the ejectors 9 makes for more economic consumption of the compressed air required for the ejection of the diamonds and increases the efficiency of the herein disclosed separator, which exhibits a high rate of separation of diamonds. The separator of the invention is, therefore, especially applicable for adaptation where ore high in its diamond content is to be treated.

The rate of wear of steel of the bowl of the the proposed separating machine has been found to be 0.15 kilogram per 6000 tons of treated ore.

The division of the radiation zone into viewing sectors at the production rate of the proposed separator of 15 tons per hour makes it possible to reduce the amount of gangue getting into the diamond concentrate to 0.036 kilograms per one grain of diamond.

The recovery rate of diamond grains with a size ranging from 2 to 4 mm during an operating cycle of the described separator was 95 percent, one diamond grain being acted upon by two or three ejectors.

The separator of the invention was employed for treatment of ores sized from 0.5 to 2 mm, and from 2 to 4 mm with a liquid-solid phase ratio of 1:5, respectively. The rotating bowl of the separator ensures uniform delivery of the feed in a single-layer stream, the amount of feed grains entering the excitation and viewing zone being rather high. It is due to the circular shape of the excitation and viewing zones that the separating machine can be made substantially small in size, thus occupying a small working area.

What is claimed is:

1. An ore separator comprising: a housing; a charging means securely mounted on said housing; a means for transferring and arranging the feed in a layer one grain thick, said transferring and arranging means being made as a bowl rotatably mounted within said housing under said charging means; a drive for rotation of sad bowl mechanically associated with said bowl; a vertical annular partition arranged around said bowl and dividing the interior of the housing into coaxially disposed compartments for separation products; a horizontal light-insulating partition arranged in said housing above said bowl; at least two X-ray tubes mounted on said horizontal light-insulating partition over the area of feeding the ore to expose the ore to radiation; photo-electric means disposed on said horizontal light-insulated partion in a region where X-ray luminescence can be received from feed grains which have received X-ray radiation; air ejector means arranged on said horizontal light-insulating partition over and along the path of travel of the feed grains opposite said vertical partition, said ejector means being electrically connected to said photoelectric means and acting upon the luminescent feed grains; said horizontal light-insulating partition being formed with respective slots for the passage of X-ray radiation from said X-ray tubes onto the feed grains, for the passage of X-ray luminescence from the feed grains onto said photo-electric means, and for the passage of air pulses from said ejector means onto the luminescent feed grains, and said horizontal partition being provided with an opening for receiving said charging means.

2. A separator as claimed in claim 1, wherein the interior surface of said bowl has a shape substantially similar to that of a paraboloid, an upper portion of said bowl having a funnel-shaped surface, the generatrix of which forms with a vertical an angle ranging from 5° to 15°.

3. A separator as claimed in claim 2, wherein a bottom portion of said bowl is fitted with radially disposed vertical blades, adjacent blades being spaced within a distance equal to at least twice the diameter of an average-sized feed grain.

4. A separator as claimed in claim 1, wherein screens are mounted on said horizontal light-insulating partition, each of said screens defining a sector within which a respective photo-electric means receives X-ray luminescence from a feed grain and transmits a signal to said air ejector means.

5. A separator as claimed in claim 4, wherein each of said photo-electric means is electrically connected to a respective ejector means, said respective ejector means being offset relative to the respective photo-electric means by an angle of displacement $$\phi = \arc\cos\frac{D_4}{D_o} - \arc\cos\frac{D_4}{D_p}$$

where $D_4$ is the diameter of the bowl, $D_o$ is the diameter of a cut-off zone, and $D_p$ is the diameter of a detection zone.

* * * * *